(12) United States Patent
Harty, Jr.

(10) Patent No.: US 8,371,243 B2
(45) Date of Patent: Feb. 12, 2013

(54) MILKING SYSTEM AND A METHOD AND APPARATUS FOR MINIMISING POWER REQUIREMENT OF A VACUUM OPERATED MILKING SYSTEM

(75) Inventor: Edmond Patrick Harty, Jr., Causeway (IE)

(73) Assignee: Dewvale Limited, Tralee (IE)

( * ) Notice: Subject to any disclaimer, the term of this patent is extended or adjusted under 35 U.S.C. 154(b) by 770 days.

(21) Appl. No.: 12/596,851

(22) PCT Filed: Apr. 28, 2008

(86) PCT No.: PCT/IE2008/000049
§ 371 (c)(1),
(2), (4) Date: Oct. 21, 2009

(87) PCT Pub. No.: WO2008/132708
PCT Pub. Date: Nov. 6, 2008

(65) Prior Publication Data
US 2010/0126420 A1    May 27, 2010

(30) Foreign Application Priority Data
Apr. 27, 2007   (IE) .................................. S2007/0317

(51) Int. Cl.
*A01J 5/08* (2006.01)
*A01J 5/04* (2006.01)
(52) U.S. Cl. ................ 119/14.02; 119/14.08; 119/14.18
(58) Field of Classification Search ............... 119/14.02, 119/14.08, 14.18, 14.41
See application file for complete search history.

(56) References Cited

U.S. PATENT DOCUMENTS

| | | | | |
|---|---|---|---|---|
| 2,997,049 | A * | 8/1961 | Thomas | 134/169 C |
| 3,228,374 | A | 1/1966 | Sampson et al. | |
| 4,476,808 | A | 10/1984 | Meermoller et al. | |
| 4,702,197 | A * | 10/1987 | Icking et al. | 119/14.18 |
| 5,762,020 | A * | 6/1998 | van der Lely | 119/14.08 |
| 2008/0041315 | A1* | 2/2008 | Stellnert et al. | 119/14.02 |
| 2010/0018465 | A1* | 1/2010 | Idensjo | 119/14.08 |

FOREIGN PATENT DOCUMENTS

| | | |
|---|---|---|
| DE | 3321752 A1 | 12/1984 |
| GB | 2316290 A | 2/1998 |

* cited by examiner

*Primary Examiner* — Kimberly Berona
(74) *Attorney, Agent, or Firm* — Sughrue Mion, PLLC

(57) ABSTRACT

A vacuum operated milking system (1) which is operable in a milking mode and a cleaning mode is provided with a vacuum system (8) which applies a vacuum to milking clusters (9) through a main milk pipeline (2) and a receiver (5) in which milk from the milking clusters (9) is collected. A pulsator valve (24) provides a pulsating vacuum to milk liners in the milking cluster (9) from the vacuum system (8). An accumulator (32) accumulates respective volumes of washing and rinsing water from a wash and rinse water trough (31) through a wash and rinse pipeline (30), which are accumulated in an annular holding chamber (43). During respective ones of a washing cycle and a rinsing cycle, a valve (54) applies atmospheric pressure to the volume of washing or rinsing water accumulated in the accumulator (32) which is urged with full flow characteristics through the main milk pipeline (2), the clusters (9) and a connecting pipe (10) for cleaning thereof. In order to minimize the maximum peak air demand on the vacuum system a control circuit (8) operates the pulsator valve (24) to apply a continuous vacuum to the milking clusters during periods when the valve (54) is operated for applying atmospheric pressure to the volume of washing or rinsing water in the accumulator (32) when the milking system (1) is operated in the cleaning mode.

22 Claims, 4 Drawing Sheets

Figure 1:
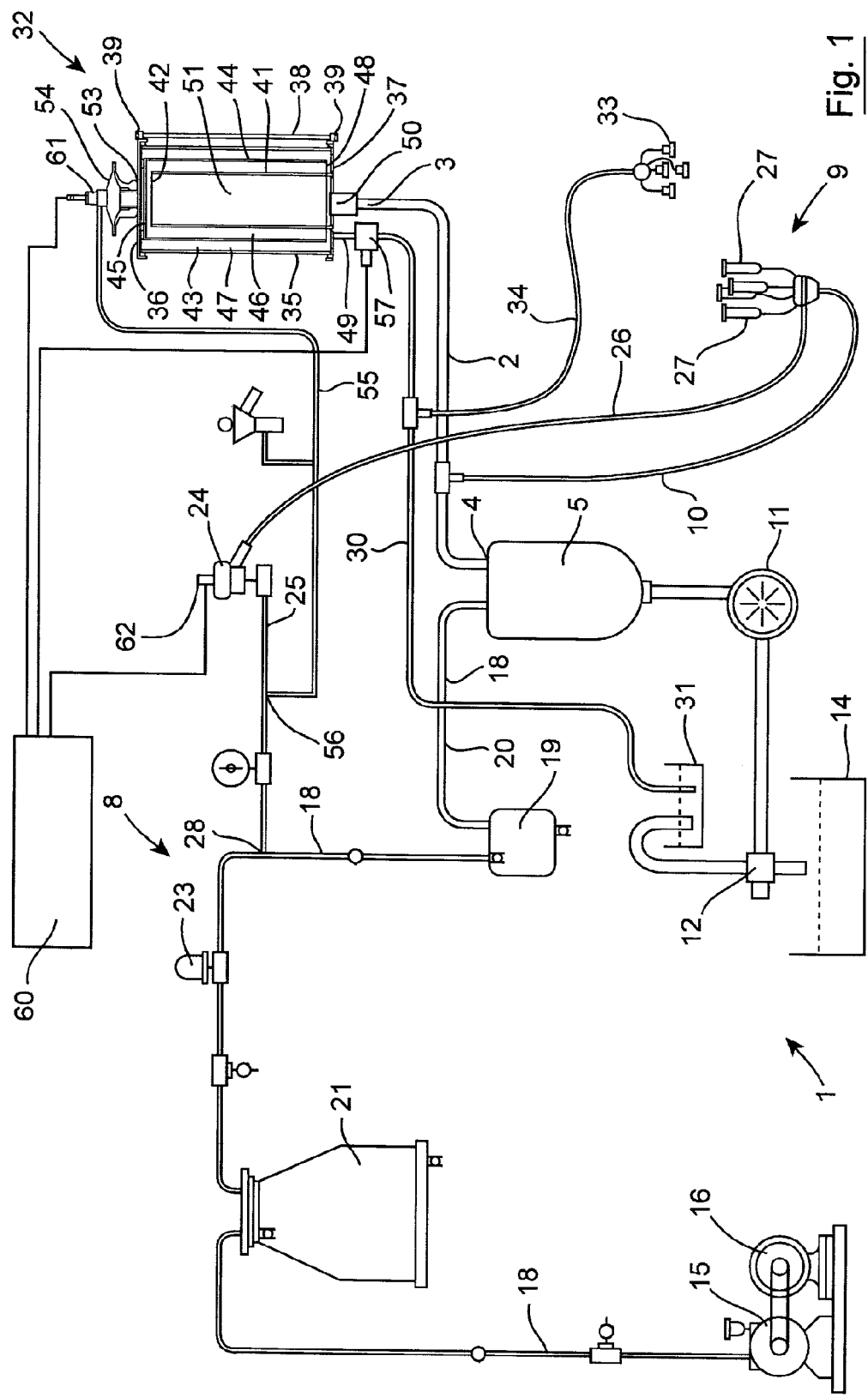

MILKING SYSTEM AND A METHOD AND APPARATUS FOR MINIMISING POWER REQUIREMENT OF A VACUUM OPERATED MILKING SYSTEM

The present invention relates to a milking system and to a method and apparatus for minimising the power requirement of a vacuum operated milking system.

Vacuum operated milking systems for milking animals such as cows are well known, and have been known and used for many years. Such milking systems are typically installed in a milking parlour, in which bail apparatus is provided to form a plurality of cubicles arranged side by side relative to each other for accommodating the animals during milking. Such milking systems require a main milk pipeline to which a plurality of milking clusters are coupled for engaging the teats of animals to be milked. The main milk pipeline typically extends overhead above the bail apparatus, and the milking clusters are Teed off from the main milk pipeline at spaced apart intervals corresponding to the cubicles. A vacuum system applies a continuous vacuum to the main milk pipeline through a milk receiver for drawing milk from the animal's teats through the milking clusters, and in turn through the main milk pipeline to the milk receiver. A pulsator valve is coupled to the vacuum system for producing a pulsating vacuum, which is applied to the milking clusters for pulsating teat liners, which are located in cups of the milking cluster during milking. The pulsating vacuum reduces the pressure of the milk liner on the animal's teats during each pulse, thus allowing blood to circulate in the teats during milking.

Such milking systems as well as being operable in a milking mode for milking animals are also operable in a cleaning mode for facilitating washing and rinsing of the main milk pipeline as well as the milking clusters, and connecting pipes which connect the milking clusters to the main milk pipeline. Vacuum operated milking systems which are operable in both a milking mode and a cleaning mode will be well known to those skilled in the art. Such a vacuum operated milking system is disclosed in Irish Patent Specification No. 81697 and corresponding British Patent Specification No. GB-A-2, 316,290. In the milking system disclosed in these two Patent specifications, apparatus is provided for accumulating respective volumes of washing and rinsing water so that the washing and rinsing water can be sequentially urged through the main milk pipeline and the milking clusters with full flow characteristics.

While the vacuum operated milking system disclosed in these two Patent specifications is perfectly adequate for milking animals and subsequent washing and rinsing of the system, the power requirement for the vacuum system is relatively high, and in general, is particularly high during washing and rinsing cycles. This is undesirable, since the components of the vacuum system, namely, the one or more vacuum pumps which may be required to provide an adequate vacuum, and the motor or motors, which typically are electrically powered for driving the vacuum pump or pumps must be selected to cope with the maximum peak vacuum demand on the vacuum system by the milking system.

There is therefore a need for a method and apparatus for minimising the power requirement of a vacuum operated milking system.

The present invention is directed towards providing a method and apparatus for minimising the power requirement of a vacuum system of a vacuum operated milking system, and the invention is also directed towards a method for operating a milking system which minimises the power requirement of a vacuum system of the milking system, and the invention is also directed towards a milking system.

According to the invention there is provided a method for minimising the power requirement of a vacuum system of a vacuum operated milking system, the method comprising reducing the demand on the vacuum system by a pulsating vacuum generator of the milking system for a time period during at least a portion of a cleaning cycle of the milking system, at least while the vacuum demand on the vacuum system is greatest.

In one embodiment of the invention the period during which the vacuum demand by the pulsating vacuum generator is reduced coincides with a portion of the cleaning cycle during which the milking system is operated to admit air at atmospheric pressure into the milking system for urging a cleaning liquid to flow through at least a portion of the milking system for cleaning thereof.

In another embodiment of the invention the time period during which the vacuum demand by the pulsating vacuum generator is reduced coincides with a portion of the cleaning cycle during which the milking system is operated to admit air at atmospheric pressure into the milking system for urging the cleaning liquid to flow through at least a portion of the milking system with full flow characteristics.

Preferably, the time period during which the vacuum demand by the pulsating vacuum generator is reduced commences prior to the commencement of the portion of the cleaning cycle during which the milking system is operated to admit air at atmospheric pressure into the milking system for urging the cleaning liquid to flow through the at least portion of the milking system.

Advantageously, the time period during which the vacuum demand by the pulsating vacuum generator is reduced commences at least one second prior to the commencement of the portion of the cleaning cycle during which the milking system is operated to admit air at atmospheric pressure into the milking system for urging the cleaning liquid to flow through the at least portion of the milking system.

Preferably, the time period during which the vacuum demand by the pulsating vacuum generator is reduced commences less than twenty seconds prior to the commencement of the portion of the cleaning cycle during which the milking system is operated to admit air at atmospheric pressure into the milking system for urging the cleaning liquid to flow through the at least portion of the milking system.

Advantageously, the time period during which the vacuum demand by the pulsating vacuum generator is reduced commences between one second and ten seconds prior to the commencement of the portion of the cleaning cycle during which the milking system is operated to admit air at atmospheric pressure into the milking system for urging the cleaning liquid to flow through the at least portion of the milking system.

Ideally, the time period during which the vacuum demand by the pulsating vacuum generator is reduced commences between two seconds and four seconds prior to the commencement of the portion of the cleaning cycle during which the milking system is operated to admit air at atmospheric pressure into the milking system for urging the cleaning liquid to flow through the at least portion of the milking system.

Preferably, the time period during which the vacuum demand by the pulsating vacuum generator is reduced continues after the end of the portion of the cleaning cycle during which the milking system is operated to admit air at atmospheric pressure into the milking system for urging the cleaning liquid to flow through the at least portion of the milking system.

Advantageously, the time period during which the vacuum demand by the pulsating vacuum generator is reduced continues for at least one second after the end of the portion of the cleaning cycle during which the milking system is operated to admit air at atmospheric pressure into the milking system for urging the cleaning liquid to flow through the at least portion of the milking system.

Preferably, the time period during which the vacuum demand by the pulsating vacuum generator is reduced continues for less than twenty seconds after the end of the portion of the cleaning cycle during which the milking system is operated to admit air at atmospheric pressure into the milking system for urging the cleaning liquid to flow through the at least portion of the milking system.

Advantageously, the time period during which the vacuum demand by the pulsating vacuum generator is reduced continues for between one second and ten seconds after the end of the portion of the cleaning cycle during which the milking system is operated to admit air at atmospheric pressure into the milking system for urging the cleaning liquid to flow through the at least portion of the milking system.

Ideally, the time period during which the vacuum demand by the pulsating vacuum generator is reduced continues for between two seconds and four seconds after the end of the portion of the cleaning cycle during which the milking system is operated to admit air at atmospheric pressure into the milking system for urging the cleaning liquid to flow through the at least portion of the milking system.

In one embodiment of the invention during the portion of the cleaning cycle during which the milking system is operated to admit air at atmospheric pressure into the milking system for urging the cleaning liquid to flow through the at least portion of the milking system, the air at atmospheric pressure is applied to the cleaning liquid, so that the pressure difference across the cleaning liquid flowing through the at least portion of the milking system is the difference between the applied atmospheric pressure and the vacuum applied to the milking system.

In one embodiment of the invention the vacuum demand by the pulsating vacuum generator is reduced by operating the pulsating vacuum generator to produce a constant pressure output at one of a vacuum and atmospheric pressure during the time period during which the vacuum demand by the pulsating vacuum generator is reduced.

Preferably, the vacuum demand by the pulsating vacuum generator is reduced by operating the pulsating vacuum generator to produce a constant vacuum during the time period during which the vacuum demand by the pulsating vacuum generator is reduced.

Alternatively, the vacuum demand by the pulsating vacuum generator is reduced by isolating the pulsating vacuum generator from the vacuum system.

The invention also provides a method for operating a milking system for minimising the power requirement of the milking system, the method comprising reducing the vacuum demand by a pulsating vacuum generator of the milking system on a vacuum system of the milking system for a time period during at least a portion of a cleaning cycle of the milking system, at least while the vacuum demand by the milking system is greatest.

In one embodiment of the invention the cleaning liquid which is to be urged through the at least portion of the milking system is provided as a volume of the cleaning liquid, and during the period that the air at atmospheric pressure is admitted to the milking system for urging the cleaning liquid through the at least portion of the milking system, the air at atmospheric pressure is applied to the cleaning liquid so that the pressure difference across the volume of cleaning liquid is the difference between the applied atmospheric pressure and the vacuum applied to the milking system by the vacuum system for urging the volume of cleaning liquid to flow through the at least portion of the milking system with full flow characteristics.

Preferably, the milking system is operated during portions of the cleaning cycle for sequentially urging at least two liquids of the cleaning liquid to flow through the at least portion of the milking system, and the vacuum demanded by the pulsating vacuum generator is reduced for respective time periods corresponding to the respective portions of the cleaning cycle during which the milking system is operated to admit air at atmospheric pressure into the milking system for urging the respective liquids of the cleaning liquid to flow through the at least portion of the milking system.

Advantageously, one of the liquids of the cleaning liquid is a washing liquid. Preferably, the washing liquid is an aqueous based washing liquid. Ideally, the washing liquid comprises a mixture of water and a cleaning composition. Preferably, the cleaning composition comprises a detergent. Advantageously, the cleaning composition is in liquid form. Preferably, the washing liquid comprises a disinfectant.

Advantageously, one of the liquids of the cleaning liquid is a rinsing liquid. Preferably, the rinsing liquid is clean water.

The invention also provides a milking system operable in a milking mode and a cleaning mode, and in the cleaning mode the milking system is operable in a cleaning cycle, the milking system comprising a main milk pipeline extending between an upstream end and a downstream end and terminating at the downstream end in a receiving means, a plurality of milking clusters coupled to the main milk pipeline at spaced apart intervals between the upstream end and the downstream end thereof, a vacuum system coupled to the main milk pipeline through the receiving means for applying a vacuum to the milking clusters for drawing milk from the milking clusters through the main milk pipeline to the receiving means, a pulsating vacuum generator coupled to the vacuum system for applying a pulsating vacuum to the milking clusters, and a control means for selectively operating the milking system with the vacuum demand by the pulsating vacuum generator reduced, the control means being responsive to the milking system being operated in the cleaning cycle for operating the milking system with the vacuum demand by the pulsating vacuum generator reduced for a time period during a portion of the cleaning cycle of the milking system, at least while the vacuum demand by the milking system is greatest.

In one embodiment of the invention the time period during which the control means operates the milking system with the vacuum demand by the pulsating vacuum generator reduced coincides with a portion of the cleaning cycle during which the milking system is operated to admit air at atmospheric pressure into the milking system for urging a cleaning liquid to flow through at least a portion of the milking system for cleaning thereof.

In another embodiment of the invention the time period during which the control means operates the milking system with the vacuum demand by the pulsating vacuum generator reduced coincides with the portion of the cleaning cycle during which the milking system is operated to admit air at atmospheric pressure into the milking system for urging the cleaning liquid to flow through the at least portion of the milking system with full flow characteristics.

Preferably, the time period during which the control means operates the milking system with the vacuum demand by the pulsating vacuum generator reduced commences prior to the commencement of the portion of the cleaning cycle during which the milking system is operated to admit air at atmospheric pressure into the milking system for urging the cleaning liquid to flow through the at least portion of the milking system.

Advantageously, the time period during which the control means operates the milking system with the vacuum demand by the pulsating vacuum generator reduced commences at least one second prior to the commencement of the portion of the cleaning cycle during which the milking system is operated to admit air at atmospheric pressure into the milking system for urging the cleaning liquid to flow through the at least portion of the milking system.

Preferably, the time period during which the control means operates the milking system with the vacuum demand by the pulsating vacuum generator reduced commences less than twenty seconds prior to the commencement of the portion of the cleaning cycle during which the milking system is operated to admit air at atmospheric pressure into the milking system for urging the cleaning liquid to flow through the at least portion of the milking system.

Advantageously, the time period during which the control means operates the milking system with the vacuum demand by the pulsating vacuum generator reduced commences between one second and ten seconds prior to the commencement of the portion of the cleaning cycle during which the milking system is operated to admit air at atmospheric pressure into the milking system for urging the cleaning liquid to flow through the at least portion of the milking system.

Ideally, the time period during which the control means operates the milking system with the vacuum demand by the pulsating vacuum generator reduced commences between two seconds and four seconds prior to the commencement of the portion of the cleaning cycle during which the milking system is operated to admit air at atmospheric pressure into the milking system for urging the cleaning liquid to flow through the at least portion of the milking system.

Preferably, the time period during which the control means operates the milking system with the vacuum demand by the pulsating vacuum generator reduced continues after the end of the portion of the cleaning cycle during which the milking system is operated to admit air at atmospheric pressure into the milking system for urging the cleaning liquid to flow through the at least portion of the milking system.

Advantageously, the time period during which the control means operates the milking system with the vacuum demand by the pulsating vacuum generator reduced continues for at least one second after the end of the portion of the cleaning cycle during which the milking system is operated to admit air at atmospheric pressure into the milking system for urging the cleaning liquid to flow through the at least portion of the milking system.

Preferably, the time period during which the control means operates the milking system with the vacuum demand by the pulsating vacuum generator reduced continues for less than twenty seconds after the end of the portion of the cleaning cycle during which the milking system is operated to admit air at atmospheric pressure into the milking system for urging the cleaning liquid to flow through the at least portion of the milking system.

Advantageously, the time period during which the control means operates the milking system with the vacuum demand by the pulsating vacuum generator reduced continues for between one second and ten seconds after the end of the portion of the cleaning cycle during which the milking system is operated to admit air at atmospheric pressure into the milking system for urging the cleaning liquid to flow through the at least portion of the milking system.

Ideally, the time period during which the control means operates the milking system with the vacuum demand by the pulsating vacuum generator reduced continues for between two seconds and four seconds after the end of the portion of the cleaning cycle during which the milking system is operated to admit air at atmospheric pressure into the milking system for urging the cleaning liquid to flow through the at least portion of the milking system.

In one embodiment of the invention a timing means is provided for timing a first time period prior to the commencement of the portion of the cleaning cycle during which the milking system is operated to admit air at atmospheric pressure into the milking system for urging the cleaning liquid to flow through the at least portion of the milking system and for timing a second time period after the end of the portion of the cleaning cycle during which the milking system is operated to admit air at atmospheric pressure into the milking system for urging the cleaning liquid to flow through the at least portion of the milking system, and the control means is responsive to the timing means commencing to time the first time period for operating the milking system with vacuum demand by the pulsating vacuum generator reduced, and for maintaining the milking system operating with the vacuum demand by the pulsating vacuum generator reduced until the timing means has timed out the second time period.

In another embodiment of the invention an accumulator is coupled to the main milk pipeline at the upstream end thereof, and defines a hollow interior region for accumulating a volume of the cleaning liquid, and a valve means is coupled to the accumulator for selectively applying air at atmospheric pressure to the hollow interior region of the accumulator at an upstream side of the volume of cleaning liquid accumulated therein, so that the pressure difference across the volume of cleaning liquid in the hollow interior region of the accumulator is the difference between the applied atmospheric pressure and the vacuum applied to the main milk pipeline by the vacuum system for urging the volume of cleaning liquid through the main milk pipeline.

In a further embodiment of the invention the milking system is operated during portions of the cleaning cycle for sequentially urging at least two liquids of the cleaning liquid to flow through the at least portion of the milking system, and the control means operates the milking system with vacuum demand by the pulsating vacuum generator reduced for respective time periods which correspond to the respective portions of the cleaning cycle during which the milking system is operated to admit air at atmospheric pressure for urging the respective liquids of the cleaning liquid to flow through the at least portion of the milking system.

In one embodiment of the invention the milking system is operated with the vacuum demand by the pulsating vacuum generator reduced by operating the pulsating vacuum generator to produce a constant pressure output at one of a vacuum and atmospheric pressure during the time period during which the vacuum demand by the pulsating vacuum generator is reduced.

Preferably, the milking system is operated with the vacuum demand by the pulsating vacuum generator reduced by operating the pulsating vacuum generator to produce a constant vacuum during the time period during which the vacuum demand by the pulsating vacuum generator is reduced.

Alternatively, the milking system is operated with the vacuum demand by the pulsating vacuum generator reduced by isolating the pulsating vacuum generator from the vacuum system.

The invention further provides apparatus for operating a vacuum operated milking system for minimising the power requirement of the milking system, the apparatus comprising a control means for operating the milking system with the vacuum demand by a pulsating vacuum generator thereof reduced, the control means being responsive to the milking system being operated in a cleaning cycle for operating the milking system with the vacuum demand by the pulsating vacuum generator reduced for a time period during at least a portion of a cleaning cycle, at least while the vacuum demand by the milking system is greatest.

The advantages of the invention are many. The methods, apparatus and the milking system according to the invention significantly reduce the energy requirement of a vacuum operated milking system. By virtue of the fact that the vacuum demand on the vacuum system of the vacuum operated milking system is reduced, and in particular, by virtue of the fact that the maximum peak vacuum demand is reduced, allows the vacuum operated milking system to be provided with a vacuum system of significantly lower capacity than the capacity of vacuum systems required for prior art milking systems of similar capacity.

Figure 2:
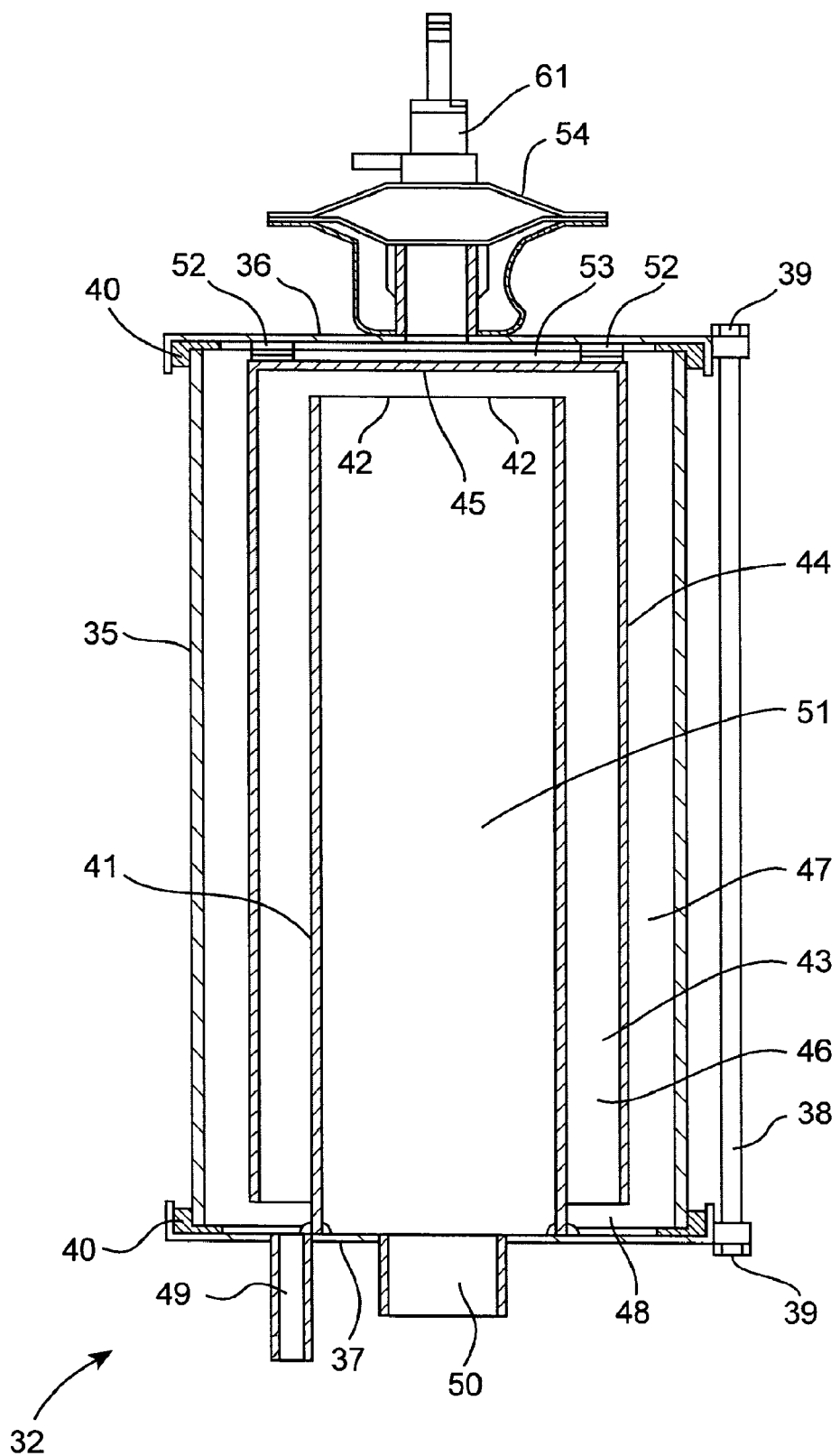
Figure 3:
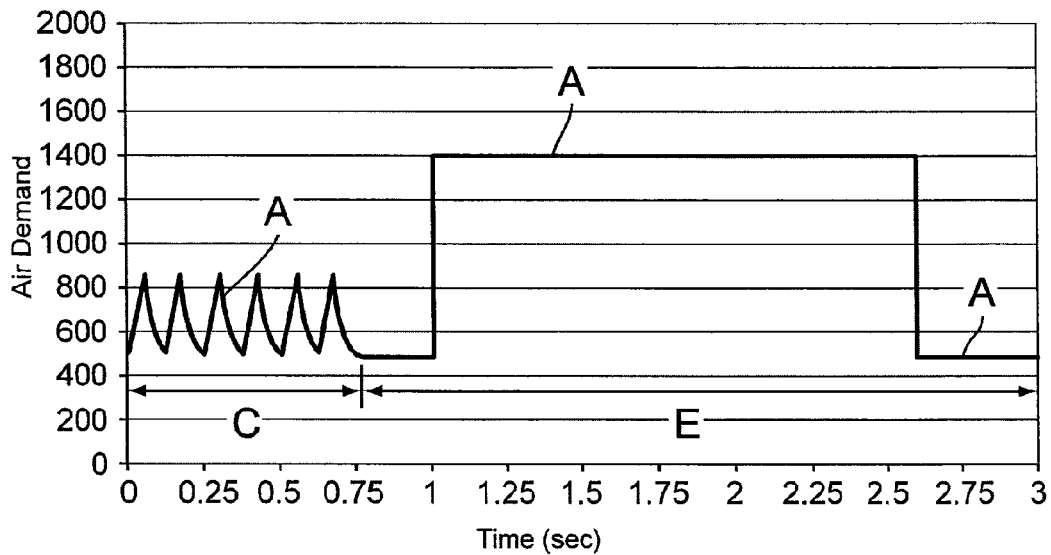
Figure 4:
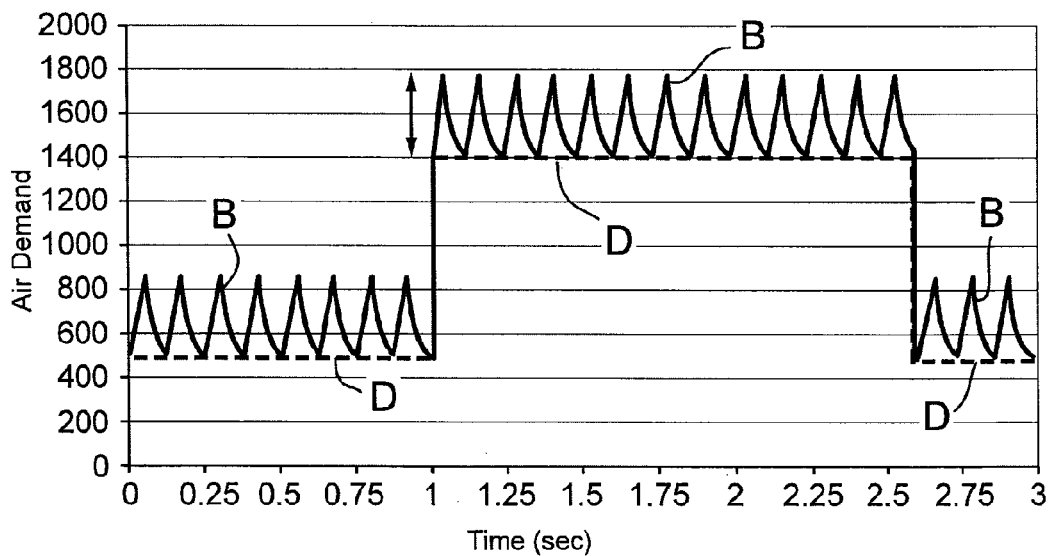
Figure 5:
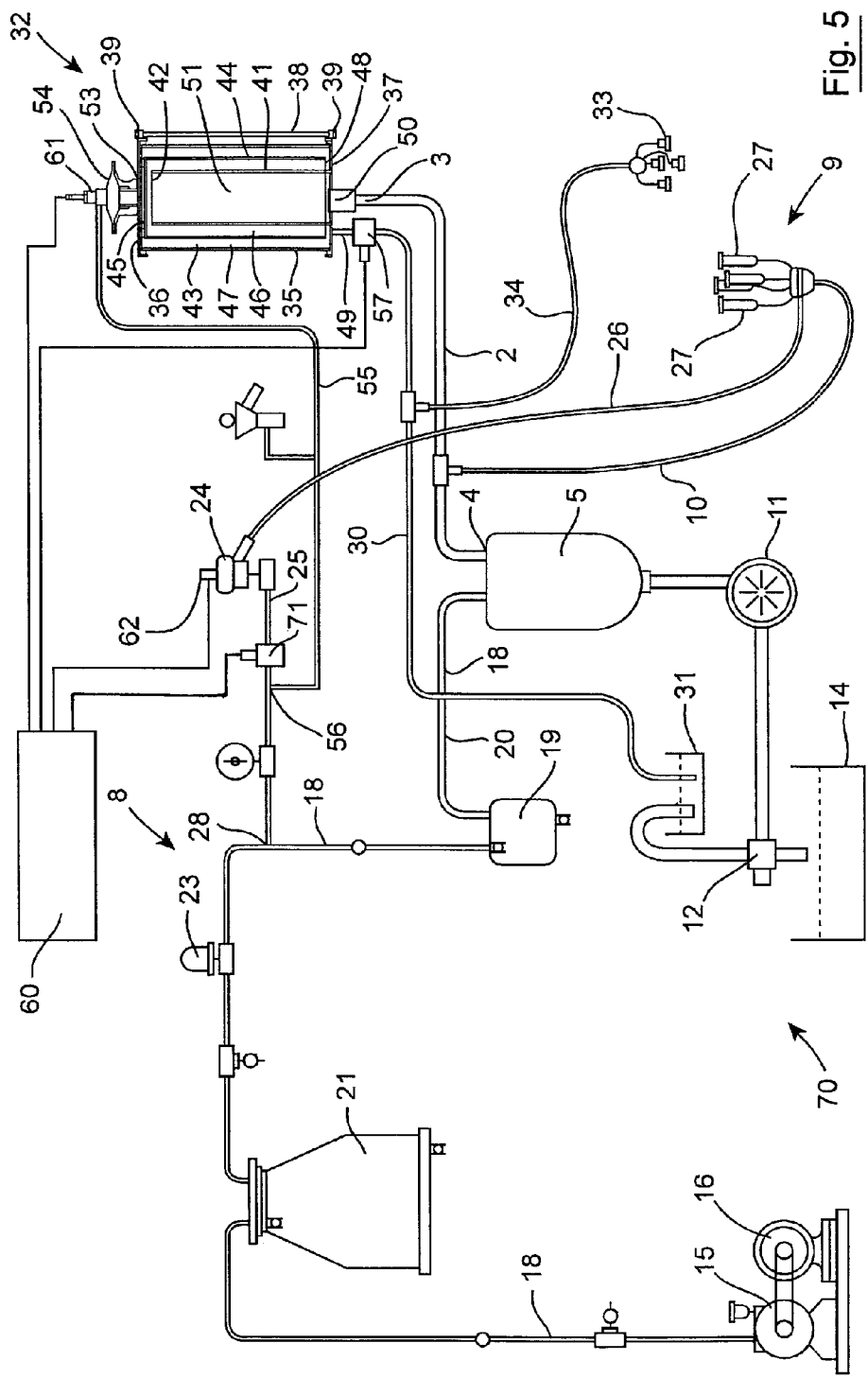

The invention will be more clearly understood from the following description of a preferred embodiment thereof, which is given by way of example only, with reference to the accompanying drawings, in which:

FIG. 1 is a schematic representation of a vacuum operated milking system according to the invention, FIG. 2 is a transverse cross-sectional side elevational view of a portion of the milking system of FIG. 1, FIG. 3 is a graphical representation of the air demand plotted against time of a vacuum system of the milking system of FIG. 1, FIG. 4 is a graphical representation of the air demand plotted against time of a vacuum system of a milking system similar to the milking system of FIG. 1 but operating according to the prior art, and FIG. 5 is a schematic representation similar to FIG. 1 of a vacuum operated milking system according to another embodiment of the invention.

Referring to the drawings and initially to FIGS. 1 and 2, there is illustrated a milking system according to the invention, indicated generally by the reference numeral 1, which is operable in both a milking mode for milking animals such as cows and a cleaning mode during which the milking system is cleaned and sterilised as will be described below. The milking system 1 comprises a main milk pipeline 2 extending from an upstream end 3 to a downstream end 4 where the main milk pipeline 2 terminates in a receiving means, namely, a receiver 5 for receiving milk from the main milk pipeline 2, and through which a continuous vacuum is applied to the main milk pipeline 2 by a vacuum system 8. A plurality of milking clusters 9, only one of which is illustrated in FIG. 1, for coupling to the teats of cows to be milked are connected to the main milk pipeline 2 at spaced apart intervals along the main milk pipeline 2 intermediate the upstream end 3 and the downstream end 4 by respective connecting pipes 10. A milk pump 11 pumps milk from the receiver 5 into a milk holding tank 14 through a two-way solenoid operated valve 12.

The vacuum system 8 comprises a vacuum pump 15 which is driven by an electrically powered motor 16 and which applies the continuous vacuum through a main vacuum line 18 to the receiver 5. A sanitary trap 19 located in the main vacuum line 18 removes milk and particulate matter which are drawn from the receiver 5 through a portion 20 of the main vacuum line 18. An interceptor 21 also located in the main vacuum line 18 removes any remaining liquids and particulate matter in the main vacuum line 18 not already removed by the sanitary trap 19. A regulator 23 in the main vacuum line 18 between the sanitary trap 19 and the interceptor 21 regulates the vacuum applied to the milking system 1.

A pulsating vacuum generator, namely, a pulsator valve 24, which will be well known to those skilled in the art, for producing a pulsating vacuum is coupled to the main vacuum line 18 through a secondary vacuum line 25 which is Teed off from the main vacuum line 18 at 28. The pulsating vacuum is applied by the pulsator valve 24 to the milking clusters 9 through corresponding connecting pipes 26 for pulsating milk liners (not shown) which are located within teat cups 27 of the milking clusters 9 for massaging the animals' teats and for relieving the pressure of the milk liners (not shown) on the teats of the animals during each vacuum pulse for permitting blood to circulate in the animals' teats during milking thereof. Only one connecting pipe 26 is illustrated in FIG. 1 corresponding to the milking cluster 9. However, a separate connecting pipe 26 is provided from the pulsator valve 24 to each milking cluster 9. A vacuum gauge in the secondary vacuum line 25 indicates the level of the continuous vacuum being applied by the vacuum system 8 in the main and secondary vacuum lines 18 and 25, respectively.

A cleaning cycle of the milking system 1 when the milking system 1 is operated in the cleaning mode comprises a sequential washing cycle and a rinsing cycle. A cleaning liquid is urged through the main milk pipeline 2, the milking clusters 9 and the connecting pipes 10 with full flow characteristics for cleaning thereof. During the washing cycle the cleaning liquid is provided by washing water, which comprises a water/detergent mix, which is described below, and during the rinsing cycle, the cleaning liquid is provided by rinsing water, which is clean water. A wash and rinse water pipeline 30 for use when the milking system 1 is being operated in the cleaning mode runs substantially parallel to and adjacent the main milk pipeline 2 for accommodating the washing and rinsing water from a wash and rinse water trough 31 to an accumulator 32. The accumulator 32 is coupled to the main milk pipeline 2 at the upstream end 3 thereof, and is similar to an accumulator described in Irish Patent Specification No. 81697 and British Patent Specification No. GB-A-2,316,290. When the milking system 1 is operated in the cleaning mode, a volume of washing water or rinsing water, depending on whether the milking system is being operated in the washing or the rinsing cycle, is accumulated in the accumulator 32. The respective volumes of washing water and rinsing water are drawn into the accumulator 32 from the wash and rinse water trough 31 by the vacuum applied to the main milk pipeline 2 through the receiver 5, as will be described below. The respective accumulated volumes of washing water and rinsing water in the accumulator 32 are evacuated from the accumulator 32 as will be described below, so that each volume of washing water and rinsing water is urged through the main milk pipeline 2 with full flow characteristics for cleaning thereof.

A plurality of jetter units 33 are coupled to the wash and rinse water pipeline 30 at spaced apart intervals along the wash and rinse water pipeline 30 by connecting pipes 34. Although only one jetter unit 33 is illustrated in FIG. 1, the number of jetter units 33 is equal to the number of milking clusters 9, and each milking cluster 9 is provided with a corresponding jetter unit 33. The jetter units 33 are adapted for coupling to the teat cups 27 of the corresponding milking clusters 9 for coupling the milking clusters 9 to the wash and rinse water pipeline 30 for accommodating flow of washing and rinsing water through the milking clusters 9 between the wash and rinse water pipeline 30 and the main milk pipeline 2 during washing and rinsing of the milking system 1.

The accumulator 32 comprises a cylindrical outer shell 35 closed at its respective opposite ends by top and bottom end caps 36 and 37, respectively. Three tie rods 38 are provided at equi-spaced intervals around the outer shell 35 and terminate in threaded ends which carry nuts 39 for securing the top and bottom end caps 36 and 37 to the outer shell 35. Only one tie rod 38 is illustrated in FIGS. 1 and 2. Seals 40 between the outer shell 35 and the top and bottom end caps 36 and 37 seal the outer shell 35 to the top and bottom end caps 36 and 37. A cylindrical inner wall 41 extending upwardly from the bottom end cap 37 terminates in a weir forming upper edge 42, and defines with the outer shell 35 an annular holding chamber 43, within which the respective volumes of washing water and rinsing water are accumulated. A cylindrical intermediate wall 44 extending downwardly from an inner upper disc 45 which is spaced apart from the top end cap 36 divides the annular holding chamber 43 into an inner annular compartment 46 and an outer annular compartment 47. The intermediate wall 44 terminates short of the bottom end cap 37 and defines with the bottom end cap 37 an annular gap 48 through which the inner and outer annular compartments 46 and 47 communicate.

An inlet port 49 in the bottom end cap 37 accommodates the washing and rinsing water from the wash and rinse water pipeline 30 into the annular holding chamber 43. An outlet port 50 in the bottom end cap 37 couples the accumulator 32 to the main milk pipeline 2. A central bore 51 defined by the inner wall 41 communicates the outlet port 50 with the annular holding chamber 43 for accommodating the washing and rinsing water therefrom through the outlet port 50 and into the main milk pipeline 2.

A plurality of spaced apart spacers 52 located around the periphery of the inner upper disc 45 space the inner upper disc 45 from the top end cap 36 to form with the top end cap 36 a chamber 53, which communicates with the outer annular compartment 47 through gaps (not shown) between the spacers 52. A valve means, namely, vacuum operated solenoid controlled valve 54 mounted on the top end cap 36 communicates with the chamber 53 through the top end cap 36, and is selectively operable for applying atmospheric pressure to the outer annular compartment 47 of the annular holding chamber 43 through the chamber 53, so that when the volume of washing or rinsing water, as the case may be, has accumulated in the annular holding chamber 43 and the continuous vacuum is applied to the main milk pipeline 2 by applying atmospheric pressure to the volume of washing or rinsing water by the operation of the valve 54, the pressure drop across the volume of washing or rinsing water is the difference between the applied atmospheric pressure and the vacuum in the main milk pipeline 2. This pressure drop is sufficient to urge the volume of washing or rinsing water from the annular holding chamber 43 over the upper edge 42 of the inner wall 41 and into the main milk pipeline 2 to flow therethrough with full flow characteristics. Vacuum for operating the valve 54 for applying atmospheric pressure to the annular holding chamber 43 is applied to the valve 54 through a vacuum line 55 which is Teed off from the secondary vacuum line 25 at 56. A solenoid valve 61 of the vacuum operated solenoid controlled valve 54 operated under the control of a control means, namely, a control circuit 60, selectively applies the vacuum to the valve 54 for operating the valve 54 for in turn applying atmospheric pressure to the annular holding chamber 43.

A solenoid operated valve 57 is located in the wash and rinse water pipeline 30 adjacent the accumulator 32 for selectively coupling the wash and rinse water pipeline 30 to the accumulator 32 during the washing and rinsing cycles of the milking system 1. The solenoid valve 57 is also operated under the control of the control circuit 60.

The control circuit 60 forms apparatus which is also according to the invention for minimising the power requirement of the milking system 1, and in turn the vacuum system 8. The control circuit 60 is programmed to operate the milking system 1 with the vacuum demand by the pulsator valve 24 reduced when the vacuum demand on the vacuum system 8 by the milking system 1 is greatest. The vacuum demand on the vacuum system 8 by the milking system 1 is greatest in the cleaning cycle during the periods during which the vacuum operated, solenoid control valve 54 is operated in the open state for applying atmospheric pressure to the volume of washing or rinsing water accumulated in the annular holding chamber 43 of the accumulator 32. In this embodiment of the invention the control circuit 60 operates the milking system 1 with the vacuum demand by the pulsator valve 24 reduced by operating the pulsator valve 24 to apply a continuous vacuum through the connecting pipes 26 to the milk liners (not shown) of the milking clusters 9.

The pulsator valve 24 comprises a solenoid actuator 62 which is operated under the control of the control circuit 60. During normal operation of the pulsator valve 24 for applying the pulsating vacuum to the milking clusters 9, the solenoid actuator 62 alternately couples the connecting pipes 26 to the vacuum system 8 and to atmospheric pressure to produce the pulsating vacuum. When the milking system 1 is operated with the vacuum demand by the pulsator valve 24 reduced, the control circuit 60 operates the solenoid actuator 62, so that the pulsator valve 24 continuously couples the connecting pipes 26 to the vacuum system 8, thereby applying a continuous vacuum to the milk liners of the milking clusters 9, thus minimising the vacuum demand by the pulsator valve 24.

Alternatively, during the periods while the milking system is to be operated with the vacuum demand by the pulsator valve 24 reduced, the solenoid actuator 62 could be operated for operating the pulsator valve 24 with the connecting pipes 26 continuously coupled to atmospheric pressure, for continuously applying atmospheric pressure to the milk liners of the milking clusters 9.

To ensure that the milking system 1 is operated with the vacuum demand by the pulsator valve 24 reduced during the entire periods of the cleaning cycle while the vacuum operated solenoid controlled valve 54 is being operated by the control circuit 60 for applying atmospheric pressure to the volume of washing or rinsing water in the annular holding chamber 43 of the accumulator 32, the control circuit 60 commences to operate the pulsator valve 54 to apply the vacuum continuously to the milking clusters 9 shortly before the valve 54 is operated to apply atmospheric pressure to the annular holding chamber 43 during a first time period of approximately three seconds, and the control circuit 60 continues to operate the pulsator valve 24 to apply the continuous vacuum for a second time period of approximately three seconds after the valve 54 has been returned to the closed state isolating the annular holding chamber 43 from atmospheric pressure. The control circuit 60 includes a timer, which may be implemented in hardware or software, which times the first time period immediately prior to operation of the valve 54 for applying atmospheric pressure to the volume of washing or rinsing water in the annular holding chamber 43 of the accumulator 32, and for timing the second time period immediately after the valve 54 has been returned to the closed state isolating the annular holding chamber 43 from atmospheric pressure. Accordingly, from the commencement of timing of the first time period, through the time period during which the valve 54 is operated for applying atmospheric pressure to the annular holding chamber 43, until the second time period has timed out, the control circuit 60 operates the pulsator valve 24 to continuously applying vacuum to the milking clusters 9. This is explained in more detail with reference to FIGS. 3 and 4.

The control circuit 60 also controls the operation of the milking system 1 and the vacuum system 8 when the milking system 1 is operating in both the milking mode and the cleaning mode. The control circuit 60 operates the milking system 1 and the vacuum system 8 in conventional fashion when the milking system 1 is operating in the milking mode. When the milking system 1 is operating in the milking mode, the control circuit 60 operates the solenoid valve 57 in the closed state in order to isolate the accumulator 32 from the main milk pipeline 2. In the milking mode the control circuit 60 operates the solenoid actuator 62 of the pulsator valve 24 in conventional fashion for applying a pulsating vacuum to the milk liners of the milking clusters 9.

When it is desired to operate the milking system 1 in the cleaning mode, the jetter units 33 are coupled to the teat cups 27 of the corresponding milking clusters 9, and the solenoid operated valve 57 is operated by the control circuit 60 in the open state to couple the accumulator 32 to the wash and rinse water pipeline 30, and in turn to the wash and rinse water trough 31. Washing or rinsing water is placed in the wash and rinse water trough 31, depending on whether the milking system 1 is being operated in the washing or rinsing cycle of the cleaning mode. During a washing cycle, for example, on the continuous vacuum being applied to the receiver 5, the washing water in the wash and rinse water trough 31 is drawn through the wash and rinse water pipeline 30 into the annular holding chamber 43 of the accumulator 32, and flows over the weir 42 formed by the inner wall 41, and is drawn through the main milk pipeline 2, and in turn to the receiver 5. The pump 11 returns the washing water to the wash and rinse water trough 31 through the two-way solenoid operated valve 12. While the washing water is being circulated from the wash and rinse water trough 31 through the wash and rinse water pipeline 30, the accumulator 32, the main milk pipeline 2, the receiver 5 and back to the wash and rinse water trough 31, the washing water is also drawn by the vacuum on the main milk pipeline 2 from the wash and rinse water pipeline 30 through the connecting pipes 34, the jetter units 33, the corresponding milking clusters 9 and the connecting pipes 10 to the main milk pipeline 2. During this part of the washing cycle the control circuit 60 operates the pulsator valve 24 in conventional fashion to apply a pulsating vacuum to the milk clusters 9.

When it is desired to urge the washing water which has accumulated in the annular holding chamber 43 through the main milk pipeline 2 with full flow characteristics, the vacuum powered solenoid operated valve 54 is operated to apply atmospheric pressure to the outer annular compartment 47 of the annular holding chamber 43 in order to urge the washing water through the main milk pipeline 2 with full flow characteristics. The water flowing through the main milk pipeline 2 with full flow characteristics flows into the receiver 5 where it is in turn pumped by the milk pump 11 through the solenoid valve 12, which is operated to return the washing water to the wash and rinse water trough 31. The timer (not shown) in the control circuit 60 commences to time the first time period immediately before the vacuum powered solenoid operated valve 54 is operated to apply atmospheric pressure to the outer annular compartment 47 of the annular holding chamber 43 of the accumulator 32, and immediately on commencement of timing of the first time period, the control circuit 60 commences to operate the pulsator valve 24 to apply a continuous vacuum to the milking clusters 9. The pulsator valve 24 is continuously operated to apply the continuous vacuum to the milking clusters 9 during the first time period, and during the period while the vacuum powered solenoid operated valve 54 is applying atmospheric pressure to the annular holding chamber 43 of the accumulator 32, and until the timer in the control circuit 60 has timed out the second time period after the valve 54 has been operated into the dosed state to no longer apply the atmospheric pressure to the annular holding chamber 43 of the accumulator 32, at which stage the pulsator valve 24 is again operated under the control of the control circuit 60 in conventional fashion to apply a pulsating vacuum to the milking clusters 9.

The operation of the milking system 1 in the rinsing cycle of the cleaning mode is similar to its operation during the washing cycle, with the exception that the washing water in the wash and rinse water trough 31 is replaced with rinsing water.

Since pulsation of the milk liners (not shown) in the teat cups 27 of the milking clusters 9 is not required during the washing and rinsing cycles of the milking system 1, operation of the pulsator valve 24 to apply a continuous vacuum to the milk liners of the milking clusters 9 during the periods while the valve 54 is in the open state applying atmospheric pressure to the annular holding chamber 43 has no adverse effect on the washing and rinsing cycles. Indeed, it is envisaged in certain cases that the control circuit 60 may be programmed for operating the pulsator valve 24 to apply a continuous vacuum to the liners of the milking clusters 9 during the entire washing and rinsing cycles of the milking system 1.

The washing water may be any suitable aqueous solution of water and a suitable detergent, and preferably a liquid detergent, and may include a sterilising, disinfecting or sanitising agent also. The rinsing water typically is clean water without any additives.

Referring now to FIGS. 3 and 4, the air demand on the vacuum system 8 plotted against time during a washing cycle is illustrated for the milking system 1 according to the invention and for a milking system similar to the milking system 1 but without the control circuit 60 being programmed for operating the pulsator valve 24 to apply the continuous vacuum to the milking clusters, and operating according to the prior art. Both the milking system 1 according to the invention and the prior art milking system are sixteen unit systems, in other words, each of the two milking systems comprise sixteen milking clusters. The graph A of FIG. 3 represents the air demand on the vacuum system 8 of the milking system 1 according to the invention during a washing cycle, while the graph B in full line of FIG. 4 represents the air demand on the vacuum system of the prior art milking system during a washing cycle.

In FIG. 3 the oscillating portion C of the graph A illustrates the air demand on the vacuum system 8 of the milking system 1 due to the operation of the pulsator valve 24 while the pulsator valve is operating in conventional fashion applying a pulsating vacuum to the milking clusters 9. The portion C of the graph A of FIG. 3 sits on top of the graph of the air demand on the vacuum system 8 resulting from the vacuum demand on the vacuum system 8 by the remainder of the milking system 1, which largely results from the continuous vacuum applied to the main milk pipeline 2 for circulating the washing water through the milking system 1. The sudden increase in the air demand illustrated by the graph A from time 1 second to approximately time 2.6 seconds results from the valve 54 being opened to apply atmospheric pressure to the volume of washing water in the annular holding chamber 43 of the accumulator 32. Clearly, it is during this period of the washing or rinsing cycle of the milking system that the air demand on the vacuum system 8 is greatest, and therefore, by operating the pulsator valve 24 to apply the continuous vacuum to the milking clusters 9 during this period of the washing cycle, the air demand on the vacuum system 8 is significantly reduced. Similar comments apply to the milking system 1 when it is being operated in the rinsing cycle of the cleaning mode.

The full line graph B of FIG. 4 illustrates the total air demand of the prior art milking system, and the graph D of FIG. 4 illustrated in broken lines illustrates the air demand on the vacuum system of the prior art milking system without the air demand on the vacuum system resulting from the operation of the pulsator valve. As can be seen, the graph D of FIG. 4 substantially coincides with the graph A of FIG. 3 over the period E during which the pulsator valve 24 of the milking system 1 is operated to apply the continuous vacuum to the milking clusters.

Accordingly, from FIG. 3 it can be seen that the maximum peak air demand on the vacuum system 8 of the milking system 1 does not exceed 1,400 liters of air per minute. However, from FIG. 4 it can be seen that the maximum peak air demand on the vacuum system of the prior art milking machine peaks at approximately 1,800 liters of air per minute. Thus, by operating the pulsator valve 24 to apply the continuous vacuum to the milking clusters 9 during periods when the valve 54 is operated for applying atmospheric pressure to the volume of washing or rinsing water in the annular holding chamber 43 of the accumulator 32, a saving in the maximum peak air demand of approximately 22% is achieved when the milking system according to the invention is operated in the cleaning mode.

It has been found that the air demand on the vacuum system 8 due to the operation of the pulsator valve 24 to produce the pulsating vacuum is typically 30 liters air per minute per milking cluster on average. This air is used as a result of opening and closing of the milk liners in the teat cups of the milking clusters and peaks just as the liner is opened. The peaks occur at the pulsation rate, which typically is once per second. In a milking system with sixteen milking clusters, the air required for pulsation is typically 480 liters per minute, while the air demand for cleaning is about 900 liters per minute where the milking system is fitted with a main milk pipeline 2 of 73 mm diameter. The reserve air requirement for a sixteen unit milking system is a minimum of 480 liters per minute, and is 800 liters per minute if automatic shut-off valves are not used in the milking clusters. Thus, the air demand during washing and rinsing of the milking system is approximately 900 liters per minute. By operating the pulsator valve 24 to apply a continuous vacuum to the milking clusters 9 while the valve 54 is operated in the open state for applying atmospheric pressure to the annular holding chamber 43, the air demand can be reduced from 1,800 liters per minute to 1,400 liters per minute, thus yielding an energy saving of 22%.

The size and number of vacuum pumps and associated motors is determined by the highest air demand, which is during the washing cycle and the rinsing cycle when the milking system is operating in the cleaning mode. The peak consists of the air demand during the washing and rinsing cycles associated with the milkline plus the other components for each unit. That peak air demand is of a very short duration, a few seconds, compared to the normal operation of the milking system, namely, an hour or more. Reducing the peak air demand for those few seconds either allows the number of pumps and motors to be reduced or the pump and motor to be geared for lower power. Therefore, by reducing the peak air demand for that short duration allows an energy saving throughout the entire operation of the milking system.

Referring now to FIG. 5, there is illustrated a milking system according to another embodiment of the invention, indicated generally by the reference numeral 70. The milking system 70 is substantially similar to the milking system 1, and similar components are identified by the same reference numerals. The only difference between the milking system 70 and the milking system 1 is that the control circuit 60 instead of being programmed to operate the pulsator valve 24 to apply a continuous vacuum to the milking clusters 9 during the period while the vacuum operated solenoid controlled valve 54 is being operated for applying atmospheric pressure to the annular holding chamber 43 of the accumulator 32, and during the first and second time periods immediately before and after the period while the valve 54 is being operated for applying atmospheric pressure to the annular holding chamber 43 of the accumulator 32, the control circuit 60 is programmed to operate an isolating means, namely, a solenoid controlled isolating valve 71 in the vacuum line 25 for isolating the pulsator valve 24 from the vacuum system 8 during the first and second time periods and during the period while the valve 54 is operated for applying atmospheric pressure to the annular holding chamber 43 of the accumulator 32. In this way the air demand on the vacuum system 8 resulting from operation of the pulsator valve 24 is also reduced and in this case is eliminated.

Otherwise, operation of the milking system 70 of FIG. 5 is similar to that of FIG. 1.

While the method and apparatus according to the invention for minimising the power requirement of the vacuum system of a milking system has been described with reference to the milking system described in Irish and British Patent Specifications Nos. 81697 and GB-A-2,316,290, it will be readily apparent to those skilled in the art that the method and apparatus according to the invention may be used with any other vacuum operated milking system which is operable in a milking and cleaning mode, and in which the vacuum demand is highest during washing and/or rinsing of the milking system, particularly in vacuum operated milking systems in which atmospheric pressure is applied to the main milk pipeline during a washing and/or rinsing cycle in order to urge washing and/or rinsing water through the main milk pipeline for cleaning thereof.

The first time period prior to the operation of the valve 54 for applying atmospheric pressure to the annular holding chamber 43 of the accumulator 32 and the second time period subsequent to the valve 54 applying atmospheric pressure to the annular holding chamber 43 of the accumulator 32 may be of any desired time durations. However, in general, it is envisaged that the first and second time periods will be greater than one second, and in general, will be less than twenty seconds. Typically, the first time period will be in the range of two seconds to four seconds, while the second time period will be in the range of two seconds to four seconds. Indeed, as discussed above, in certain cases, it is envisaged that the pulsator valve may be operated to apply a continuous vacuum to the milking clusters, or to apply continuous atmospheric pressure to the milking clusters, or the pulsating valve may be isolated from the vacuum system during the entire period while the milking system is being operated in the cleaning mode.

The invention claimed is:

1. A method for minimising the power requirement of a vacuum system of a vacuum operated milking system, the method comprising reducing the demand on the vacuum system by a pulsating vacuum generator of the milking system for a time period during at least a portion of a cleaning cycle of the milking system, at least while the vacuum demand on the vacuum system is greatest.

2. A method as claimed in claim 1 in which the time period during which the vacuum demand by the pulsating vacuum generator is reduced coincides with a portion of the cleaning cycle during which the milking system is operated to admit air at atmospheric pressure into the milking system for urging a cleaning liquid to flow through at least a portion of the milking system for cleaning thereof.

3. A method as claimed in claim 2 in which the time period during which the vacuum demand by the pulsating vacuum generator is reduced commences prior to the commencement of the portion of the cleaning cycle during which the milking system is operated to admit air at atmospheric pressure into the milking system for urging the cleaning liquid to flow through the at least portion of the milking system, and continues after the end of the portion of the cleaning cycle during which the milking system is operated to admit air at atmospheric pressure into the milking system for urging the cleaning liquid to flow through the at least portion of the milking system.

4. A method as claimed in claim 1 in which the vacuum demand by the pulsating vacuum generator is reduced by operating the pulsating vacuum generator to produce a constant pressure output at one of a vacuum and atmospheric pressure during the time period during which the vacuum demand by the pulsating vacuum generator is reduced.

5. A method as claimed in claim 1 in which the vacuum demand by the pulsating vacuum generator is reduced by isolating the pulsating vacuum generator from the vacuum system.

6. A method for operating a milking system for minimising the power requirement of the milking system, the method comprising reducing the vacuum demand by a pulsating vacuum generator of the milking system on a vacuum system of the milking system for a time period during at least a portion of a cleaning cycle of the milking system, at least while the vacuum demand by the milking system is greatest.

7. A method as claimed in claim 6 in which the time period during which the vacuum demand by the pulsating vacuum generator is reduced coincides with a portion of the cleaning cycle during which the milking system is operated to admit air at atmospheric pressure into the milking system for urging a cleaning liquid to flow through at least a portion of the milking system for cleaning thereof.

8. A method as claimed in claim 7 in which the time period during which the vacuum demand by the pulsating vacuum generator is reduced commences prior to the commencement of the portion of the cleaning cycle during which the milking system is operated to admit air at atmospheric pressure into the milking system for urging the cleaning liquid to flow through the at least portion of the milking system, and continues after the end of the portion of the cleaning cycle during which the milking system is operated to admit air at atmospheric pressure into the milking system for urging the cleaning liquid to flow through the at least portion of the milking system.

9. A method as claimed in claim 7 in which the cleaning liquid which is to be urged through the at least portion of the milking system is provided as a volume of the cleaning liquid, and during the time period that the air at atmospheric pressure is admitted to the milking system for urging the cleaning liquid through the at least portion of the milking system, the air at atmospheric pressure is applied to the cleaning liquid so that the pressure difference across the volume of cleaning liquid is the difference between the applied atmospheric pressure and the vacuum applied to the milking system by the vacuum system for urging the volume of cleaning liquid to flow through the at least portion of the milking system with full flow characteristics.

10. A method as claimed in claim 7 in which the milking system is operated during portions of the cleaning cycle for sequentially urging at least two liquids of the cleaning liquid to flow through the at least portion of the milking system, and the vacuum demanded by the pulsating vacuum generator is reduced for respective time periods corresponding to the respective portions of the cleaning cycle during which the milking system is operated to admit air at atmospheric pressure into the milking system for urging the respective liquids of the cleaning liquid to flow through the at least portion of the milking system, one of the liquids of the cleaning liquid being a washing liquid, and one of the liquids of the cleaning liquid being a rinsing liquid.

11. A method as claimed in claim 6 in which the vacuum demand by the pulsating vacuum generator is reduced by operating the pulsating vacuum generator to produce a constant pressure output at one of a vacuum and atmospheric pressure during the time period during which the vacuum demand by the pulsating vacuum generator is reduced.

12. A method as claimed in claim 6 in which the vacuum demand by the pulsating vacuum generator is reduced by isolating the pulsating vacuum generator from the vacuum system.

13. A milking system operable in a milking mode and a cleaning mode, and in the cleaning mode the milking system is operable in a cleaning cycle, the milking system comprising a main milk pipeline extending between an upstream end and a downstream end and terminating at the downstream end in a receiving means, a plurality of milking clusters coupled to the main milk pipeline at spaced apart intervals between the upstream end and the downstream end thereof, a vacuum system coupled to the main milk pipeline through the receiving means for applying a vacuum to the milking clusters for drawing milk from the milking clusters through the main milk pipeline to the receiving means, a pulsating vacuum generator coupled to the vacuum system for applying a pulsating vacuum to the milking clusters, and a control means for selectively operating the milking system with the vacuum demand by the pulsating vacuum generator reduced, the control means being responsive to the milking system being operated in the cleaning cycle for operating the milking system with the vacuum demand by the pulsating vacuum generator reduced for a time period during a portion of the cleaning cycle of the milking system, at least while the vacuum demand by the milking system is greatest.

14. A milking system as claimed in claim 13 in which the time period during which the control means operates the milking system with the vacuum demand by the pulsating vacuum generator reduced coincides with a portion of the cleaning cycle during which the milking system is operated to admit air at atmospheric pressure into the milking system for urging a cleaning liquid to flow through at least a portion of the milking system for cleaning thereof.

15. A milking system as claimed in claim 14 in which the time period during which the control means operates the milking system with the vacuum demand by the pulsating vacuum generator reduced commences prior to the commencement of the portion of the cleaning cycle during which the milking system is operated to admit air at atmospheric pressure into the milking system for urging the cleaning liquid to flow through the at least portion of the milking system, and continues after the end of the portion of the cleaning cycle during which the milking system is operated to admit air at atmospheric pressure into the milking system for urging the cleaning liquid to flow through the at least portion of the milking system.

16. A milking system as claimed in claim 14 in which a timing means is provided for timing a first time period prior to the commencement of the portion of the cleaning cycle during which the milking system is operated to admit air at atmospheric pressure into the milking system for urging the cleaning liquid to flow through the at least portion of the milking system and for timing a second time period after the end of the portion of the cleaning cycle during which the milking system is operated to admit air at atmospheric pressure into the milking system for urging the cleaning liquid to flow through the at least portion of the milking system, and the control means is responsive to the timing means commencing to time the first time period for operating the milking system with vacuum demand by the pulsating vacuum generator reduced, and for maintaining the milking system operating with the vacuum demand by the pulsating vacuum generator reduced until the timing means has timed out the second time period.

17. A milking system as claimed in claim 14 in which the milking system is operated during portions of the cleaning cycle for sequentially urging at least two liquids of the cleaning liquid to flow through the at least portion of the milking system, and the control means operates the milking system with vacuum demand by the pulsating vacuum generator reduced for respective time periods which correspond to the respective portions of the cleaning cycle during which the milking system is operated to admit air at atmospheric pressure for urging the respective liquids of the cleaning liquid to flow through the at least portion of the milking system, one of the liquids of the cleaning liquid being a washing liquid, and one of the liquids of the cleaning liquid being a rinsing liquid.

18. A milking system as claimed in claim 13 in which the control means operates the milking system is operated with the vacuum demand by the pulsating vacuum generator reduced by operating the pulsating vacuum generator to produce a constant pressure output at one of a vacuum and atmospheric pressure.

19. A milking system as claimed in claim 13 in which the control means operates the milking system with the vacuum demand by the pulsating vacuum generator reduced by isolating the pulsating vacuum generator from the vacuum system.

20. Apparatus for operating a vacuum operated milking system for minimising the power requirement of the milking system, the apparatus comprising a control means for operating the milking system with the vacuum demand by a pulsating vacuum generator thereof reduced, the control means being responsive to the milking system being operated in a cleaning cycle for operating the milking system with the vacuum demand by the pulsating vacuum generator reduced for a time period during at least a portion of a cleaning cycle, at least while the vacuum demand by the milking system is greatest.

21. Apparatus as claim in claim 20 in which the time period during which the control means operates the milking system with the vacuum demand by the pulsating vacuum generator reduced coincides with a portion of the cleaning cycle during which the milking system is operated to admit air at atmospheric pressure into the milking system for urging a cleaning liquid to flow through at least a portion of the milking system for cleaning thereof.

22. Apparatus as claimed in claim 21 in which the time period during which the control means operates the milking system with the vacuum demand by the pulsating vacuum generator reduced commences prior to the commencement of the portion of the cleaning cycle during which the milking system is operated to admit air at atmospheric pressure into the milking system for urging the cleaning liquid to flow through the at least portion of the milking system, and continues after the end of the portion of the cleaning cycle during which the milking system is operated to admit air at atmospheric pressure into the milking system for urging the cleaning liquid to flow through the at least portion of the milking system.

\* \* \* \* \*

UNITED STATES PATENT AND TRADEMARK OFFICE
CERTIFICATE OF CORRECTION

PATENT NO. : 8,371,243 B2  Page 1 of 1
APPLICATION NO. : 12/596851
DATED : February 12, 2013
INVENTOR(S) : Edmond Patrick Harty, Jr.

It is certified that error appears in the above-identified patent and that said Letters Patent is hereby corrected as shown below:

In the Specification

Column 10, line 14, delete

"operated, solenoid control valve 54 is operated in the"

and insert

--operated solenoid control valve 54 is operated in the--

In the Claims

Column 17, line 35, claim 18, delete

"control means operates the milking system is operated with"

and insert

--control means operates the milking system with--

Signed and Sealed this
Twenty-fifth Day of February, 2014

Michelle K. Lee
*Deputy Director of the United States Patent and Trademark Office*